(12) United States Patent
MeLampy et al.

(10) Patent No.: US 7,912,088 B2
(45) Date of Patent: Mar. 22, 2011

(54) SYSTEM AND METHOD FOR PROVIDING SESSION ADMISSION CONTROL

(75) Inventors: Patrick John MeLampy, Pepperell, MA (US); Robert Flagg Penfield, Concord, MA (US); Kevin P. Klett, Boston, MA (US)

(73) Assignee: Acme Packet, Inc., Burlington, MA (US)

( * ) Notice: Subject to any disclaimer, the term of this patent is extended or adjusted under 35 U.S.C. 154(b) by 828 days.

(21) Appl. No.: 11/560,970

(22) Filed: Nov. 17, 2006

(65) Prior Publication Data

US 2007/0076603 A1    Apr. 5, 2007

Related U.S. Application Data

(63) Continuation of application No. 10/198,852, filed on Jul. 19, 2002, now Pat. No. 7,151,781.

(51) Int. Cl.
*H04J 3/16* (2006.01)
(52) U.S. Cl. ......... 370/468; 370/252; 370/352; 370/401
(58) Field of Classification Search ................. None
See application file for complete search history.

(56) References Cited

U.S. PATENT DOCUMENTS

| | | | | |
|---|---|---|---|---|
| 5,784,358 | A | * | 7/1998 | Smith et al. ............ 370/230 |
| 6,094,431 | A | * | 7/2000 | Yamato et al. ......... 370/395.21 |
| 6,154,465 | A | * | 11/2000 | Pickett .................. 370/466 |
| 6,894,991 | B2 | | 5/2005 | Ayyagari et al. |
| 7,151,781 | B2 | * | 12/2006 | MeLampy et al. ....... 370/468 |
| 2001/0043571 | A1 | | 11/2001 | Jang et al. |
| 2002/0016937 | A1 | | 2/2002 | Houth |
| 2002/0114282 | A1 | * | 8/2002 | MeLampy et al. ....... 370/238 |
| 2003/0058851 | A1 | | 3/2003 | Goldman |
| 2005/0002405 | A1 | | 1/2005 | Gao |

FOREIGN PATENT DOCUMENTS

| | | |
|---|---|---|
| EP | 1098490 A2 | 2/2000 |
| EP | 1148688 A1 | 3/2000 |

OTHER PUBLICATIONS

Internet Draft, Veltri Luca, et al., "SIP Extension for QoS Support in Diffserv Networks," Oct. 2001, pp. 1-20.
Network Working Group, S. Herzog, "RSVP Extensions for Policy Control," Jan. 2000, pp. 1-13.
SIP Working Group, Internet Draft, W. Marshall, et al., "SIP Extensions for Media Authorization," Feb. 2002, pp. 1-14.
Internet Draft, Stefano Salsano, "COPS Usage for Outsourcing Diffserv Resource Allocation," Oct. 2001, pp. 1-18.
Working Group, Internet Draft, G. Bianchi, et al., "A Migration Path to Provide End-to-end QoS Over Stateless Networks by Means of a Probing-driven Admission Control," Nov. 2001, pp. 1-17.

(Continued)

*Primary Examiner* — Duc C Ho
(74) *Attorney, Agent, or Firm* — Thomas, Kayden, Horstemeyer & Risley, LLP (57) ABSTRACT

A system and method for providing session admission control are provided. Generally, a source of a communication request and a session director are utilized. The session director allocates bandwidth to accommodate a bandwidth allocation request from the source, ensures that quantity of the allocated bandwidth is appropriate for transmission of multimedia packets from the source to the session director, and ensures that quality of service of the allocated bandwidth is appropriate to provide a flow of the multimedia packets via the allocated bandwidth.

20 Claims, 7 Drawing Sheets

OTHER PUBLICATIONS

Network Working Group, K. Chan, et al. "COPS Usage or Policy Provisioning (COPS-PR)," Mar. 2001, www.faqs.org/rfcs/rfc3084.html, pp. 1-26.

"VoIP Call Admission Control," Version No. 1, Jun. 29, 2001, pp. 1-50.

Telchemy, Alan Clark, "QoS Management for Voice Over IP," Robinson Humphrey Software & Technology Conf. 2001, pp. 1-16.

Cisco Systems, USA, Silvano Gai, "Enterprise VoIP," Terena 2000, ftp://ftpeng.cisco.com/sgai/2000voip.pdf, pp. 1-31.

Internet Draft, Diana Rawlins, et al., "Edge Based Admission Control with Class Based Resource management," Feb. 27, 2002, pp. 1-15.

Network Working Group, R. Yavatkar, et al., SBM (Subnet Bandwidth Manager): A Protocol for RSVP-based Admission Control Over IEE 802-style Networks, May 2000, pp. 1-58.

Network Working Group, R. Yavatkar, et al., "A Framework for Policy-Based Admission Control," Jan. 2000, pp. 1-20.

RAP Working Group, L-N. Hamer, et al., "Session Authorization for RSVP," Feb. 2002, pp. 1-15.

* cited by examiner

| ORIGINATING REALM 326 | PART OF REALM 328 | LAYER 2 332 | INTERFACE 334 | SUB-INTERFACE 336 | ADDRESS 338 | MAXIMUM BANDWIDTH 342 | ALLOCATED BANDWIDTH 344 | QoS SCORE 346 |
|---|---|---|---|---|---|---|---|---|
| ACME PACKET | ZONE 1 | ENET | 1 | 1 | 10.0.0.1/24 | 800 KB | 16 KB | 1.00 |
| | | | | | | | | |
| | | | | | | | | |

SYSTEM AND METHOD FOR PROVIDING SESSION ADMISSION CONTROL

CROSS-REFERENCE TO RELATED APPLICATION

This application is a continuation of U.S. utility application entitled "System and Method for Providing Session Admission Control", having Ser. No. 10/198,852, filed Jul. 19, 2002.

FIELD OF THE INVENTION

The present invention generally relates to telecommunication and, more particularly, to session admission control.

BACKGROUND OF THE INVENTION

Most networks used today allow routing of small units of data, referred to as packets, based on destination addresses identified by the packets. In fact, communication via packet data networks that use packet transmission technologies such as, asynchronous transfer mode (ATM), frame relay and Internet protocol, has become a preferred data transmission strategy. Dividing data communication into packets allows sharing of a single data path between multiple users in the same network.

Interfaces between different networks such as enterprise networks and public data networks, typically have constrained resources, which are further explained below. Examples of interfaces include, but are not limited to, T1/T3 connections, and digital subscriber line (DSL) or cable modem type connections. The capacity of the above-mentioned interfaces is significantly less than the capacity within networks. As an example, it is standard to use fast Ethernet within an enterprise network, wherein fast Ethernet supports data transfer rates of up to approximately one hundred Megabits per second (100 Mbps). However, an interface between the enterprise network and a public data network may be a T1 connection, which supports data transfer rates of up to approximately 1.5 Mbps. Unfortunately, the maximum data transfer rate of the T1 connection is 1.5 percent of the maximum data transfer rate of the enterprise network. Therefore, packets that are to be transmitted from the enterprise network are queued and may ultimately be discarded after a timeout period as the packets wait to enter the constrained interface.

Quality of service (QoS) problems occur in packet flows due to packet processing constraints. As is known by those of ordinary skill in the art, QoS is a networking term that specifies a guaranteed packet throughput level. Since packets are typically lost after being queued for a brief period of time, it is difficult to guarantee a throughput level for a particular packet flow or destination.

Peering points between public data networks also have constrained interfaces that are typically a Gigabit Ethernet connection, an optical carrier three (OC3) connection or an OC12 connection. Fortunately, most network uses are tolerant of packet loss, and/or packet delays.

Many emerging types of peer-to-peer communication have real-time communication requirements. As an example, instant messaging from companies such as, but not limited to, Yahoo®, MSN®, and AOL® include options that allow users to speak to each other in near real-time, in addition to viewing each other. Voice over Internet protocol (VoIP) accommodates real-time communication requirements since VoIP requires real-time flows of packets. Specifically, VoIP sends digital voice information in discrete packets rather than in traditional circuit-committed protocols of the public switched telephone network (PSTN). Media gateways, such as the Sonus Networks of Westford Mass., USA, GSX-9000, are sources of real-time media flows. Many other types of bandwidth services have committed bit rates based on end-user requirements for process control and other private uses.

Figure 1:
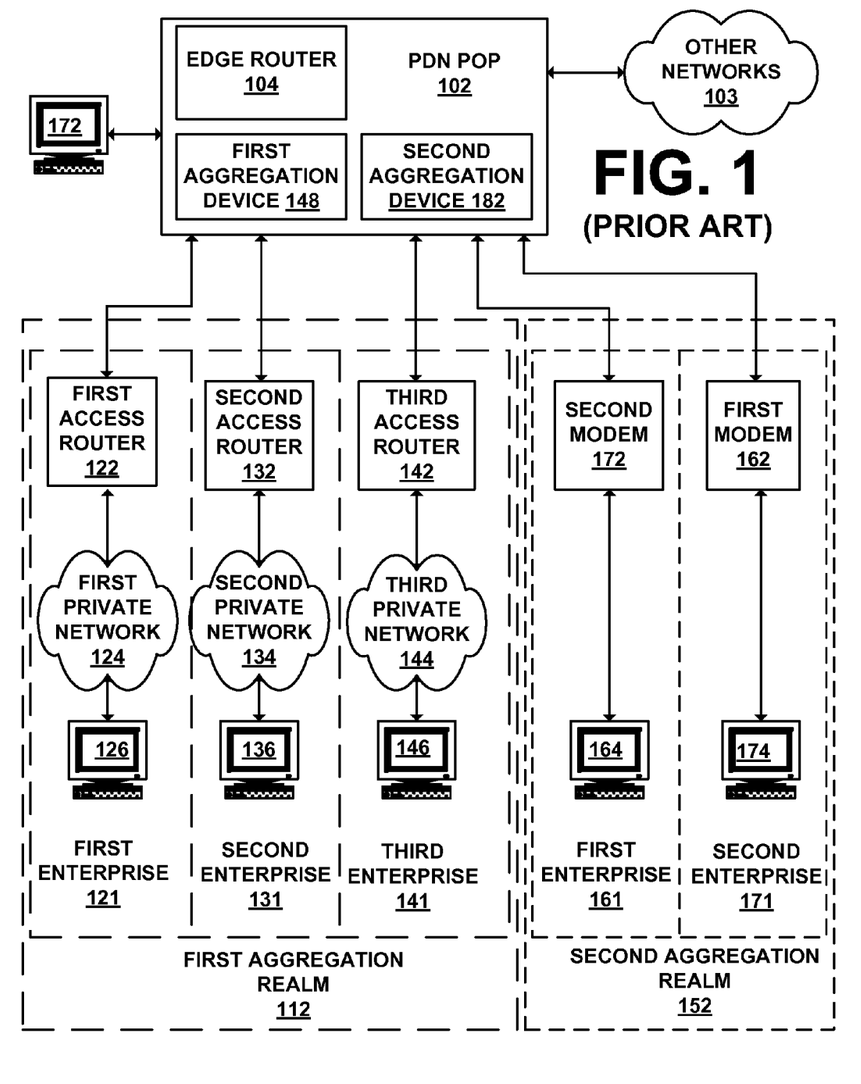
FIG. 1 is a block diagram illustrating a prior art communication layout.

Therefore, since real-time communication is required, it is desirable to alleviate constrained resources introduced by typical interfaces between different networks. An example of a network that may require real-time communication is shown by FIG. 1. FIG. 1 is a block diagram of a prior art communication layout between a point-of-presence (POP) located within a public data network (PDN) aggregation point (referred to hereafter as PDN POP), a first aggregation realm 112 and a second aggregation realm 152. It should be noted that other networks 103 may be connected to the PDN POP 102. As known by those having ordinary skill in the art, a realm is a part of a network containing network devices. Examples of realm may include private networks, enterprises, etc.

As shown by FIG. 1, the PDN POP 102 contains an edge router 104 for routing data between the first aggregation realm 112 and the second aggregation realm 152 that are located downstream from the edge router 104 and separate from the PDN POP 102. Examples of edge routers include, but are not limited to, the Cisco 75xx, Cisco 10xxx and the Cisco 12xxx, manufactured by Cisco Systems, Inc. of San Jose, Calif., USA.

The PDN POP 102 also contains a first aggregation device 148, which is preferably a layer-two aggregation device. An example of an aggregation device may be an aggregation switch, such as the Lucent CBX500, manufactured by Lucent Technologies of Murray Hill, N.J., USA. The first aggregation device 148 allows communication between a first enterprise 121, a second enterprise 131 and a third enterprise 141 located within the first aggregation realm 112. In addition, via use of the edge router 104, the first aggregation device 148 allows communication between the first aggregation realm 112 and the second aggregation realm 152.

A second aggregation device 182, which is preferably a layer-two aggregation device, is also located within the PDN POP 102. The second aggregation device 182 allows communication between a first enterprise 161 and a second enterprise 171 located within the second aggregation realm 152. In addition, via use of the edge router 104, the second aggregation device 182 allows communication between the second aggregation device 152 and the first aggregation device 112.

The first aggregation realm 112 contains the first enterprise 121, the second enterprise 131 and the third enterprise 141. The first enterprise 121 contains a first access router 122, a first private data network 124 and a first computer 126 for use by a user. The second enterprise 131 contains a second access router 132, a second private data network 134 and a second computer 136 for use by a user. The third enterprise 141 contains a third access router 142, a third private data network 144 and a third computer 146 for use by a user. Each access router 122, 132, 142 located within an enterprise 121, 131, 141 provides a connection from a computer 126, 136, 146 to the PDN POP 102. Users of network services made available by the PDN POP 102 may be connected to the PDN POP 102 from within the PDN POP 102, or external to the PDN POP 102. A fourth computer 172 is illustrated by FIG. 1, which provides a user with direct access to the PDN POP 102 from outside of the PDN POP 102.

Each access router 122, 132, 142 provides a connection to one of the private data networks 124, 134, 144. As an example, the first access router 122 provides a connection to the first private data network 124. Each access router 122, 132, 142 also allows communication between a user, via a computer 126, 136, 146 and other portions of the first aggregation realm 112.

The second aggregation realm 152 contains the first enterprise 161 and the second enterprise 171. The first enterprise 161 located within the second aggregation realm 152 contains a first modem 162 and a first computer 164, for use by a user. The second enterprise 171 located within the second aggregation realm 152 contains a second modem 172 and a second computer 174 for use by a user. The first modem 162 and the second modem 172 may be digital subscriber line (DSL) modems, or any other category of modem.

Links connecting different portions of the PDN POP 102 may create constraints that force packets to be queued. The following provides an example of possible link properties within the PDN POP 102. Core network access links connecting the edge router 104 to devices within the PDN POP 102, such as Internet backbone routers (not shown), for example, may operate at OC48, which operates at approximately 2.5 Gigabits per second (Gps), or OC 192, which operates at approximately 10 Gbps. The edge router 104 divides communication between the first aggregation device 148 located within the first aggregation realm 112 and the second aggregation device 182, located within the second aggregation realm 152. Lines of communication between the edge router 104 and the aggregation devices 148, 182 typically operate at packet over synchronous optical network seven (SONET 7) or SONET twenty (SONET 20).

The aggregation devices 148, 182 decrease data transmission speeds to lower speed connections including, for example, frame relay over T1 or T3, asynchronous transfer mode (ATM) over T3, point-to-point protocol (PPP) over a high speed serial interface (HSSI) and/or DSL. The access routers 122, 132, 142 and modems 162, 172 terminate links from the aggregation devices 148, 182 and convert bandwidth flows to 10/100 Ethernet. Therefore, the slowest links are between the aggregation devices 148, 182 and the access routers 122, 132, 142 or modems 162, 172.

The edge router 104 is unaware of downstream bandwidth congestion. Edge routers may be programmed to build a queue for each logical end point in the POP PDN 102, thereby enabling a weighted fair distribution of packets based upon virtual downstream transmission capacity. Edge router weighted fair distribution queuing is not presently used to address bandwidth congestion for numerous reasons including, but not limited to, degradation in performance of the edge router and potentially complex provisioning mechanisms for which to plan.

To address bandwidth congestion after a fair distribution of packets has been weighted, it is generally believed that by recognizing which packets are associated with real-time requirements, edge routers and access routers can sequence packets to prevent queuing or discarding of packets. Unfortunately, techniques for identifying which packets are real-time packets require expensive packet classification microcircuits and configuration. Therefore, most existing edge routers and access routers would need to be updated or replaced.

In addition, once the real-time packets are identified, it is difficult to associate the real-time packets with an expected volume of packets to perform bandwidth reservation or allocation. To address difficulty in association of real-time packets, a resource reservation setup protocol (RSVP) device is typically used for requesting bandwidth and for requesting termination of RSVP requests at the edge router. As is known by those of ordinary skill in the art, RSVP is a protocol that allows a software application to reserve resources from a source to a destination along a routed path comprising one or more packet routers. Thereafter, RSVP-enabled routers may schedule and prioritize packets to fulfill QoS requirements. RSVP associates bandwidth requests with destination IP addresses, many of which are reused by enterprise firewalls. Therefore, a real-time flow could be replaced by a standard flow, however bandwidth allocation for real-time flows would be valid until an RSVP time-out.

Using the RSVP and the packet classification together would provide an enhanced capability for outbound flows from the enterprises. However, there is presently no mechanism to insert an RSVP request at an edge router for real-time flows originating from outside of the edge router. It should also be noted that in some signaling systems such as, but not limited to, session initiation protocol (SIP), the actual destination address may not be known at the time that it would be necessary to perform a bandwidth reservation.

Unfortunately, it is difficult for edge routers to identify and characterize the flow of packets since it is difficult to identify the start of a flow simply by observing individual packets. In addition, it is equally hard to characterize the end of a flow. To increase difficulty, many real-time flows utilize silence compression, which is defined by packet flows stopping during a duration of silence and beginning again when there is energy to transmit data packets. This inconsistency in the progression of packet flow causes difficulty in the identification of the start of a flow.

Bandwidth management at edges of networks has been researched via use of SIP, which is an industry standard signaling mechanism for session establishment. An Internet draft entitled "SIP Extensions for QoS Support in Diffserv Networks," by Veltri Luca, having filename draft-veltri-sip-qsip-00.txt and being published October 2001, teaches the use of SIP extensions to manage and provision edge routers. To manage and provision edge routers, a SIP proxy determines which edge routers are ingress and egress routers from an administrative domain so that common open policy service (COPS) based policies for packet flows can be administered. As is known by those of ordinary skill in the art, COPS is a protocol used to transmit from a policy decision point (PDP) to a policy enforcement point (PEP). Unfortunately, there is no quality measurement included in deciding which edge routers are the ingress and egress routers and there is no flow interruption detection.

Similarly, an Internet draft entitled "SIP Extensions for Media Authorization," by D. Evans et al., having filename draft-ietf-sip-call-auth-04. txt and being published February 2002, documents the utilization of a token distributed from a PDP to enable QoS based admissions to a network at an edge router. Unfortunately, the token does not include a measure of quality based on an originating realm that may be located downstream from an aggregation device located within a network. Additionally, policy-based admissions are being performed based on resources provisioned in the edge router that may not reflect downstream limitations.

The Internet draft entitled "A Migration Path to Provide End-to-End QoS over Stateless Networks by Means of a Probing-Driven Admission Control," by G. Bianchi, having filename draft-bianchi-blefari-end-to-end-qos-02.txt and being published November 2001, describes a technique for determining the quality of a packet flow prior to admitting the flow within a network. Quality determination is provided by a source transmitting a burst of packets as a probe to a destination test point located near the actual destination of the packet flow. This burst of packets is similar to what an additional multimedia flow would generate. By analyzing the performance of the returned packets from the destination test point, one could make an assumption about the quality of the additional multimedia flow. The source sends a burst of packets to the destination test point, which then transits the burst of packets back to the source. The source of the probe can then estimate jitter, packet-loss, and latency from the burst. As is known by those of ordinary skill in the art, jitter is a measurement of the variation of the gap between packets on a flow. An alternative definition is that jitter is the variance in latency for a multimedia flow.

The burst of packets is intended to resemble a packet flow requesting admission to the destination. Therefore, if the packet flow is, for example, a G.711 flow, the burst of packets reflects that the packet flow is a G.711 flow. Once the sender measures the quality of the packet flow, admission of the packets to the destination may resume. One problem with this technique is that it requires a destination address for the packet flow to be known prior to transmission. Many signaling protocols are routable or travel through proxies and gateways. It is often the case that addresses are not known until there is a successful setup of the packet flow via signaling. Unfortunately, waiting until there is a successful setup of the packet flow may be too late to stop the packet flow from alerting or ringing the destination. Therefore, a signaling system would announce the arrival of a communication session, before a bandwidth path has been allocated.

Still other deficiencies with the technique taught by G. Bianchi include an undesirable delay in learning bandwidth quality on an allocated path. This delay may be several hundred milliseconds in length. The delay may be acceptable if one destination is tested, however should there be several destinations, or if the test is performed multiple times throughout a multi-network arrangement (once in each network), the delay may be too large for real-time communications.

Another Internet draft entitled, "Session Authorization for RSVP," by Hamer et al., having filename draft-ieff-rap-rsvp-authsession-02.txt and being published February 2002, describes an RSVP authorization element for session admission control. This element can be used to request bandwidth from an edge router that supports RSVP. Since edge routers are not currently capable of measuring quality on a flow-by-flow basis, there is no minimum required quality based admission control in the RSVP authorization element. Additionally, there is no support for downstream aggregation limitations that may be advisory. In addition, the RSVP authorization element is based on IP addresses. Since a protocol and port field are not mandatory RSVP fields, even if a source and destination IP address are supplied, the RSVP authorization element may not be capable of differentiating between a real-time transport protocol (RTP) flow and a file transfer protocol (FTP) flow arriving from the same network point. Therefore, a multimedia session may not be supported by RSVP authorization elements until the elements are protocol aware and session aware.

The Internet draft entitled, "A Framework for Policy-Based Admission Control," by Yavatkar, et al. and being published January 2000, further describes RSVP authorization elements. This Internet draft is concerned with specifying a framework for providing policy-based control over admission control decisions. Unfortunately, the Internet draft by Yavatkar, et al., does not describe flow-by-flow signaled admission and quality based admission.

An RSVP Internet draft entitled, "Edge Based Admission Control with Class Based Resource Management," by Rawlins et al., having filename draft-rawlins-admctl-ds-mgt-02.txt and being published February 2002, describes an upstream pool of bandwidth to be allocated by an Integrate services over the Internet (Intserv) class model. Unfortunately, quality measurements are not used in real-time admission control. Additionally, reservations of bandwidth are based on upstream limitations, instead of downstream limitations.

An Internet draft entitled, "A Protocol for RSVP-based Admission Control over IEEE 802-style Networks," by Yavatkar et al. and being published May 2000, describes a subnet bandwidth manager protocol. The protocol is a signaling mechanism to insert a manager between a LAN and an RSVP based layer 3 routing network. However, this Internet draft does not contain a mechanism for performing admission control based on actual observed quality or on nested layers of aggregation links.

Sitara Networks of Waltham Mass., USA builds products that perform deep packet analysis to assist in support of VoIP in enterprise networks, an example of which is QosArray™. The QosArray product integrates high touch packet processing and classification with layer 2 quality schemes, such as 802.1p, and virtual LANs (VLANs), such as 802.1q, to prioritize VoIP at access points to constrained links, such as wide area network (WAN) connections between networks. The Sitara products are not signaling aware and, therefore, cannot reject a communication attempt. This may result in a packet flow being rejected, however neither the source nor the destination of the packet flow will be aware of the flow rejection. Rejection of the packet flow without notice will most likely result in an unexpected outcome.

Allot Communications, of Eden Prairie, Minn., USA, has developed a product referred to as the NetEnforcer™ that does special processing on VoIP packets to perform per flow queuing. The NetEnforcer™ also splits packets (e.g., a packet with 20 ms of speech is split into two packets, each with 10 ms of speech) to guarantee that there will be less latency injected on slow speed transmissions within a WAN. The NetEnforcer works in a COPS or RSVP based router network to perform packet admission control. Unfortunately, the NetEnforcer™ does not participate in signaling plans (i.e., SIP, media gateway control protocol (MGCP), H.323), does not measure packet quality in real-time and does not incorporate packet quality into an admission decision.

In addition, U.S. Pat. No. 6,404,864 (hereafter, the '864 patent), to Evslin et. al., discloses a network routing scheme to control the routing of telephone calls based on quality measurements. The quality measurements are collected at the end of each call, tabulated, and used to make subsequent routing decisions. Therefore, quality is not measured in real-time. Additionally, the '864 patent does not describe advisory bandwidth limits per realm, does not disclose the notion of downstream or upstream networks, and does not prevent telephone calls from being admitted to a network. Instead, the '864 patent describes the controlling of routing once a telephone call is admitted to the network.

In summary, it is desirable to have packet flow control and QoS packet flow admission control, not only prior to entrance of packets to a network, such as the PDN POP 102 of FIG. 1, but also downstream from an edge router and as the packet flow leaves the network and is admitted to another network.

SUMMARY OF THE INVENTION

In light of the foregoing, the first exemplary embodiment of the present invention generally relates to a system for providing session admission control.

Generally, with reference to the structure of the system, the system utilizes a source of a communication request and a session director. The session director is used for allocating bandwidth to accommodate a bandwidth allocation request from the source, for ensuring that quantity of the allocated bandwidth is appropriate for transmission of multimedia packets from the source to the session director, and for ensuring that quality of service of the allocated bandwidth is appropriate to provide a flow of the multimedia packets via the allocated bandwidth.

The present invention can also be viewed as providing a method of providing session admission control. In this regard, the method can be broadly summarized by the following steps: allocating bandwidth to accommodate a bandwidth allocation request; ensuring that quantity of the allocated bandwidth is appropriate for transmission of multimedia packets; and ensuring that quality of service of the allocated bandwidth is appropriate to provide a flow of the multimedia packets via the allocated bandwidth.

Other systems and methods of the present invention will be or become apparent to one with skill in the art upon examination of the following drawings and detailed description. It is intended that all such additional systems, methods and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION

Figure 2:
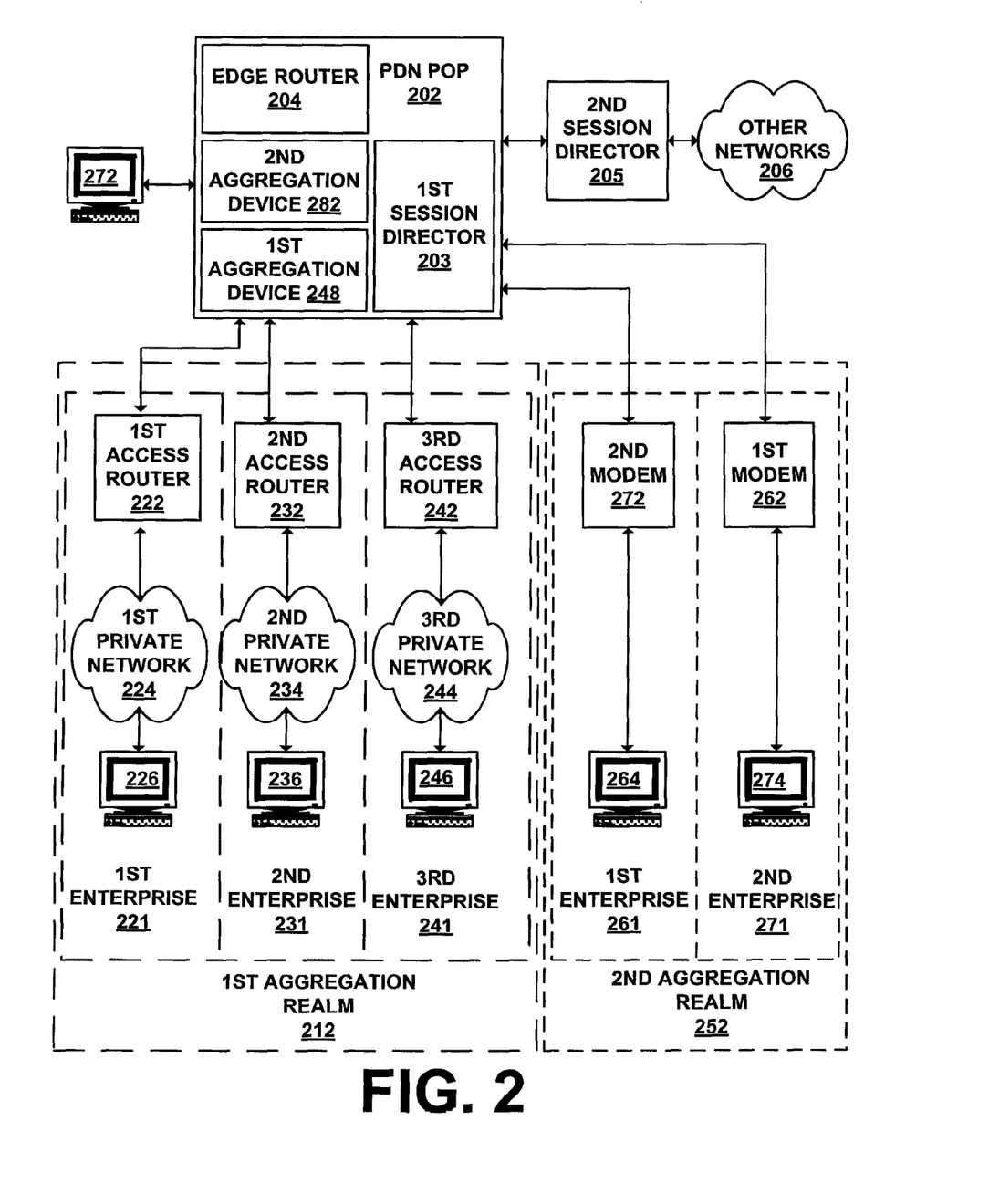
FIG. 2 is a block diagram illustrating a communication layout in accordance with a first exemplary embodiment of the invention.

Turning now to the drawings, wherein like reference numeral designate corresponding parts throughout the drawings, FIG. 2 is a block diagram illustrating a communication layout in accordance with a first exemplary embodiment of the invention. Specifically, FIG. 2 illustrates a communication layout between a PDN POP 202, a second session director 205 located at a network peering point connected to the PDN POP 202, a first aggregation realm 212 and a second aggregation realm 252.

As is explained in detail below, the session directors 203, 205 provide packet flow control and QoS packet flow admission control, not only prior to entrance of packets to the PDN POP 202, but also downstream from an edge router and as the packet flow leaves the PDN POP 202 network and is admitted to other networks 206. It should be noted that the session directors 203, 205 may be located within any category of network, instead of within the PDN POP 202 of FIG. 2. Examples of alternative network locations may include enterprise networks, constrained points within a core network such as access to a submarine transport link, etc. In fact, the session directors 203, 205 may be utilized anywhere that there may be a contention for access to a slower bandwidth transport link.

The PDN POP 202 contains an edge router 204 for routing data between the first aggregation realm 212 and the second aggregation realm 252 that are located downstream from the edge router 204. The PDN POP 202 also contains a first aggregation device 248, which is preferably a layer-two aggregation device. The first aggregation device 248 enables communication between a first enterprise 221, a second enterprise 231 and a third enterprise 241 located within the first aggregation realm 212. In addition, via use of the edge router 204, the first aggregation device 248 enables communication between the first aggregation realm 212 and the second aggregation realm 252. Since those having ordinary skill in the art have knowledge of how aggregation devices enable communication, the present disclosure does not further describe how an aggregation device enables communication.

A second aggregation device 282, which is preferably a layer-two aggregation device, is also located within the PDN POP 202. The second aggregation device 282 enables communication between a first enterprise 261 and a second enterprise 271 located within the second aggregation realm 252. In addition, via use of the edge router 204, the second aggregation device 282 enables communication between the second aggregation realm 252 and the first aggregation realm 212.

The first aggregation realm 212 contains the first enterprise 221, the second enterprise 231 and the third enterprise 241. The first enterprise 221 contains a first access router 222, a first private data network 224 and a first computer 226 for use by a user. The second enterprise 231 contains a second access router 232, a second private data network 234 and a second computer 236 for use by a user. The third enterprise 241 contains a third access router 242, a third private data network 244 and a third computer 246 for use by a user. It should be noted that it is not necessary for the user to communicate via use of a computer. Instead, the user may communicate via use of any communication device, examples of which include, but are not limited to, VoIP telephones, such as the Pingtel VoIP telephone, IP telephones and VoIP gateways.

Each access router 222, 232, 242 located within an enterprise 221, 231, 241 provides a connection from a computer 226, 236, 246 to the PDN POP 202. Users of network services made available by the PDN POP 202 may be connected to the PDN POP 202 from within the PDN POP 202, or from a location external to the PDN POP 202, such as the first computer 226, the second computer 236 and the third computer 246. A fourth computer 272 is illustrated by FIG. 2, which also provides a user with direct access to the PDN POP 202 from outside of the PDN POP 202.

Each access router 222, 232, 242 provides a connection to one of the private data networks 224, 234, 244. As an example, the first access router 222 provides a connection to the first private data network 224. Each access router 222, 232, 242 also allows communication between a user, via a computer 226, 236, 246, and other portions of the first aggregation realm 212.

The second aggregation realm 252 contains the first enterprise 261 and the second enterprise 271. The first enterprise 261 located within the second aggregation realm 252 contains a first modem 262 and a first computer 264, for use by a user. The second enterprise 271 located within the second aggregation realm 252 contains a second modem 272 and a second computer 274, for use by a user. The first modem 262 and the second modem 272 may be DSL modems, or any other category of modem.

The first session director 203 is located at a service edge of the POP PDN 202, where the first session director 203 allocates and manages bandwidth for a source of a communication request located either internal or external to the PDN POP 202, and ensures that quality and quantity of the allocated bandwidth is appropriate for communication. As an example, if the source of the communication request were either the first computer 226, the second computer 236 or the third computer 246 within the first aggregation realm 212, bandwidth would be allocated and managed between the edge router 204 and either the first access router 222, the second access router 232, or the third access router 242, respectively. If instead, the source of the communication request were either the first computer 264 or the second computer 274 within the second aggregation realm 252, bandwidth would be allocated and managed between the edge router 204 and either the first modem 262 or the second modem 272, respectively.

Alternatively, as stated above, the second session director 205 is located at a network peering point that is connected to the PDN POP 202. The second session director 205 allocates and manages bandwidth for a source of a communication request located either internal or external to the PDN POP 202, ensures that quality and quantity of the allocated bandwidth is appropriate for communication. As an example, if the source were located within a remote network represented by the label "other networks" 206 in FIG. 2, bandwidth would be allocated and managed between the edge router 204 and a device, such as, but not limited to, an access router or modem within the remote network. Functions performed by the first session director 203 and the second session director 205 are described in detail below.

Figure 3:
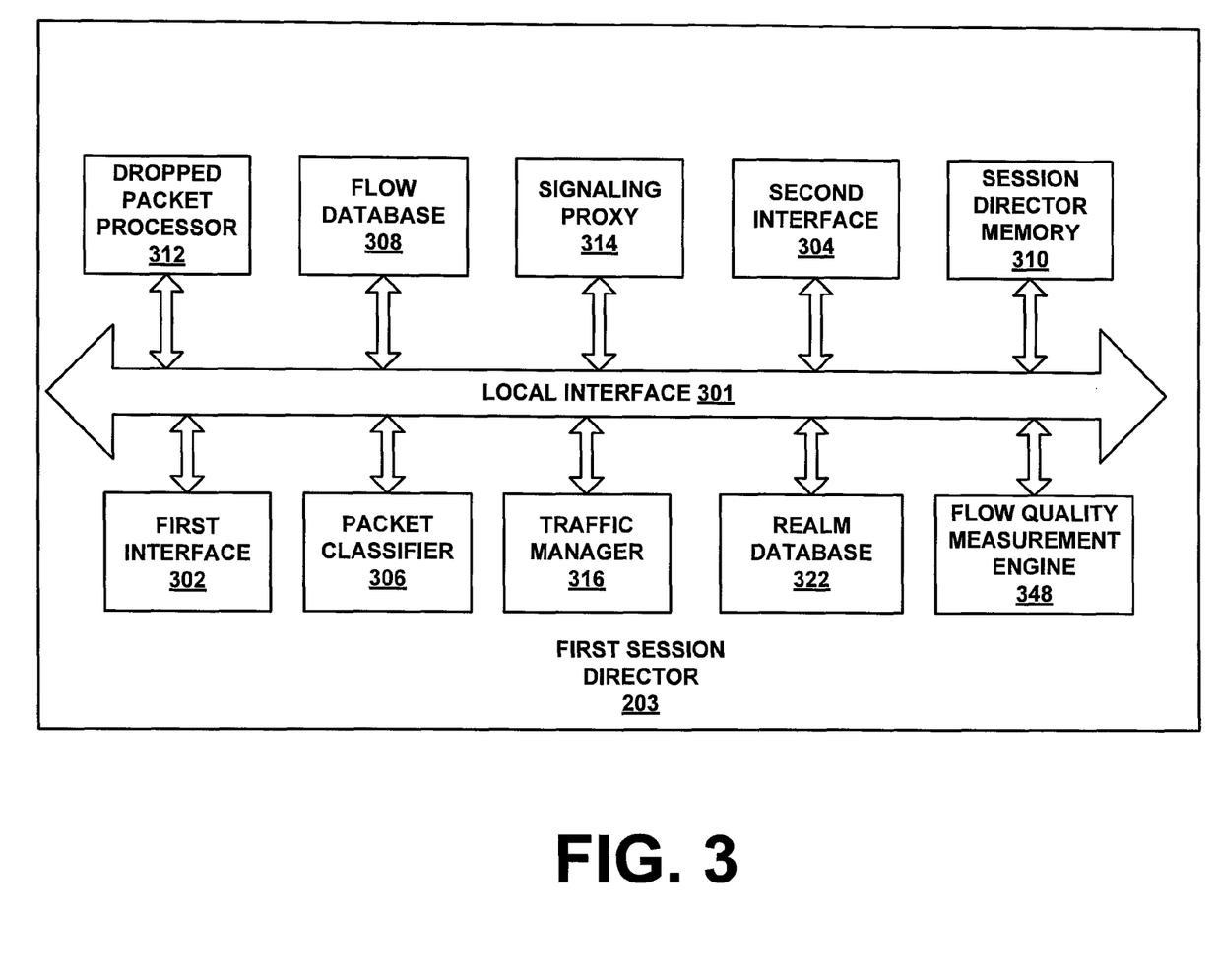
FIG. 3 is a block diagram that further illustrates the first session director of FIG. 2.

FIG. 3 is a block diagram that further illustrates the first session director 203 of FIG. 2. It should be noted that the second session director 205 (FIG. 2) contains the same components and performs the same functions as the first session director 203. Therefore, the following description of the first session director 203 is also applicable to the second session director 205 (FIG. 2). In addition, it should be noted that the arrangement of components within FIG. 3 is not intended to represent a sequential order to packet processing.

In accordance with the first exemplary embodiment of the invention, the first session director 203 contains a first interface 302 and a second interface 304. It should be noted that there may be additional or fewer interfaces located within the first session director 203. The first interface 302 is used by the first session director 203 for receiving multimedia packets and signaling messages that establish a path of communication for the multimedia packets. The second interface 304 is used by the first session director 203 for transmitting multimedia packets and signaling messages.

Each interface 302, 304 is assigned at least one address, such as an IP address, and a media access control (MAC) address for identification of the interface 302, 304 within the PDN POP 202 (FIG. 2). Since each interface 302, 304 is assigned at least one IP address and a MAC address, the first session director 203 is capable of receiving and transmitting signaling messages, such as SIP INVITE messages, thereby establishing a communication path for multimedia packet flows. As an example, the signaling messages may establish a communication path from a source device or network to the first session director 203. In addition, the first session director 203 is capable of receiving and transmitting multimedia packet flows after a communication path has been established. The IP addresses provide identification of each interface 302, 304 for the transmission and receipt of multimedia packets and signaling messages, while the MAC address is a unique hardware number assigned to the first session director 203 for the transmission and receipt of multimedia packets and signaling messages.

A packet classifier 306 is located within the first session director 203 for determining a category of packet received by the first session director 203. Examples of categories of packets include, but are not limited to, RTP packets or real-time transport control protocol (RTCP) packets. Therefore, the packet classifier 306 can determine if a received packet is a signaling packet, such as the RTCP packet, or a multimedia packet such as the RTP packet.

A flow database 308 is also located within the first session director 203. It should be noted that the flow database 308 may be any electronic, magnetic, optical, and/or other type of storage media. The flow database 308 stores a pool of IP addresses and port addresses that are provisioned by an administrator of the PDN POP 202 (FIG. 2). In accordance with the first exemplary embodiment of the invention, a pool of addresses is created by an administrator for each realm or network connected to a session director. Therefore, the pool of IP addresses and port addresses stored within the flow database 308 comprises IP addresses and port addresses for networks or realms defined by the first enterprise 221 (FIG. 2) within the first aggregation realm 212 (FIG. 2), the second enterprise 231 (FIG. 2) within the first aggregation realm 212 (FIG. 2), the third enterprise 241 (FIG. 2) within the first aggregation realm 212 (FIG. 2), the first enterprise 261 (FIG. 2) within the second aggregation realm 252 (FIG. 2), the second enterprise 271 (FIG. 2) within the second aggregation realm 252 (FIG. 2) and the PDN POP 202 (FIG. 2).

Predefined keys are stored within a session director memory 310, wherein each predefined key defines an ordered listing of executable instructions for implementing a series of logical functions capable of determining if information stored within the flow database 308 is useful to the first session director 203. It should be noted that the session director memory 310 may include any one or combination of volatile memory elements (e.g., random access memory (RAM, such as dynamic RAM (DRAM), static RAM (SRAM), synchronous DRAM (SDRAM), etc.)) and nonvolatile memory elements (e.g., read only memory (ROM), etc.). Moreover, the session director memory 308 may incorporate electronic, magnetic, optical, and/or other types of storage media. In addition, the session director memory 310 may be a content addressable memory.

Examples of information that may be considered useful may include: a source/destination IP address; a source/destination protocol; a source/destination port address; an asynchronous transfer mode (ATM) permanent virtual circuit (PVC) number; and, protocol and port combinations that classify a multimedia packet as a particular category of message (e.g., for SIP, user datagram protocol (UDP) and port 5016 causes the multimedia packet to be classified as a SIP message).

Packets that have been identified by the packet classifier 306 as signaling packets are then examined by the packet classifier 306 to determine if the signaling packets do not contain information identified as useful by the predefined keys. Signaling packets determined to not contain information identified as useful are transmitted to a dropped packet processor 312 located within the first session director 203. The dropped packet processor 312 temporarily stores signaling packets that have been dropped due to non-compliance with the information identified as useful by the predefined keys. The dropped packet processor 312 may then be used to identify a source of dropped signaling packets to address denial of service attempts via use of the PDN POP 202 (FIG. 2). As a result, the source of the dropped signaling packets may be tested to determine why the source has not properly signaled for transmission of multimedia packets.

A traffic manager 316 is also located within the first session director 203. At startup of the first session director 203, the traffic manager 316 forwards signaling packets that have not been dropped, to a signaling proxy 314. As described above, the signaling packets were determined to be signaling packets by the packet classifier 306. In addition, the packet classifier 306 was utilized to individually determine if each of the signaling packets contained useful information, as identified by a predefined key provisioned by an administrator. As an example, packets sent on protocol UDP to port 5016 would be considered SIP signaling packets. The signaling proxy 314 is used to process signaling messages received by the first session director 203, as is described in detail below.

The traffic manager 316 may also be used for measuring and enforcing IP session multimedia packet flow rates, otherwise referred to as traffic, thereby providing traffic measurement capability to the first session director 203. An example of a commercially available traffic manager 316 is an NPX5700 traffic manager, which is sold by MMC Networks located in California, USA. The traffic manager 316 works in unison with the signaling proxy 314 so that once a forwarding decision has been made by the signaling proxy 314, the traffic manager 316 queues multimedia packets, provisioned for by signaling packets, into their respective multimedia packet flows in an associated priority defined by the signaling proxy 314.

If a signaling packet is received by the signaling proxy 314, the signaling proxy 314 analyzes the signaling packet in accordance with a category of signaling system used by the first session director 203, as is described in detail below. As an example, the signaling system could be an H.323 standard system, a SIP system or an MGCP system.

In most cases, when an initial signaling packet is transmitted from a source, a destination for a multimedia packet flow originating from the source of the initial signaling packet is not known. As an example, in SIP, when an INVITE signaling packet is transmitted to a network, the final destination of a multimedia packet flow associated with the INVITE signaling packet is not known. Specifically, when the INVITE signaling packet is transmitted, neither an IP address, nor a port number or MAC address are known for the final destination of the multimedia packet flow.

While the destination for a multimedia packet flow is not known, the first session director 203 is capable of using information from a signaling packet to allocate and manage bandwidth from a source and ensure that quality and quantity of the allocated bandwidth is appropriate for communication from the source prior to allowing the source of the signaling packet transmit multimedia packets. Specifically, the signaling proxy 314 uses a realm database table 324 to determine bandwidth availability of the source, allocate bandwidth for transmission of multimedia packets from the source and ensure that bandwidth quality is appropriate for transmission of multimedia packets from the source. The description of FIG. 4 further describes the realm database 322. In addition, the first session director 203 contains a flow quality measurement engine 348.

The first interface 302, second interface 304, packet classifier 306, flow database 308, dropped packet processor 312, signaling proxy 314, traffic manager 316, realm database 322, and flow quality measurement engine 348 are communicatively coupled via a local interface 301. The local interface 301 can be, for example but not limited to, one or more buses or other wired or wireless connections, as is known in the art. The local interface 301 may have additional elements, which are omitted for simplicity, such as controllers, buffers (caches), drivers, repeaters, and receivers, to enable communications. Further, the local interface 301 may include address, control, and/or data connections to enable appropriate communications among the aforementioned components.

It should be noted that, while the present detailed description does not address determination of a destination, a detailed description of determining a destination for a packet is provided by patent application entitled, "System and Method for Determining a Destination for an Internet Protocol Packet," by Dobbins, et al, having Ser. No. 10/103,408 and being filed Mar. 21, 2002, the disclosure of which is incorporated by reference in its entirety.

Figure 4:
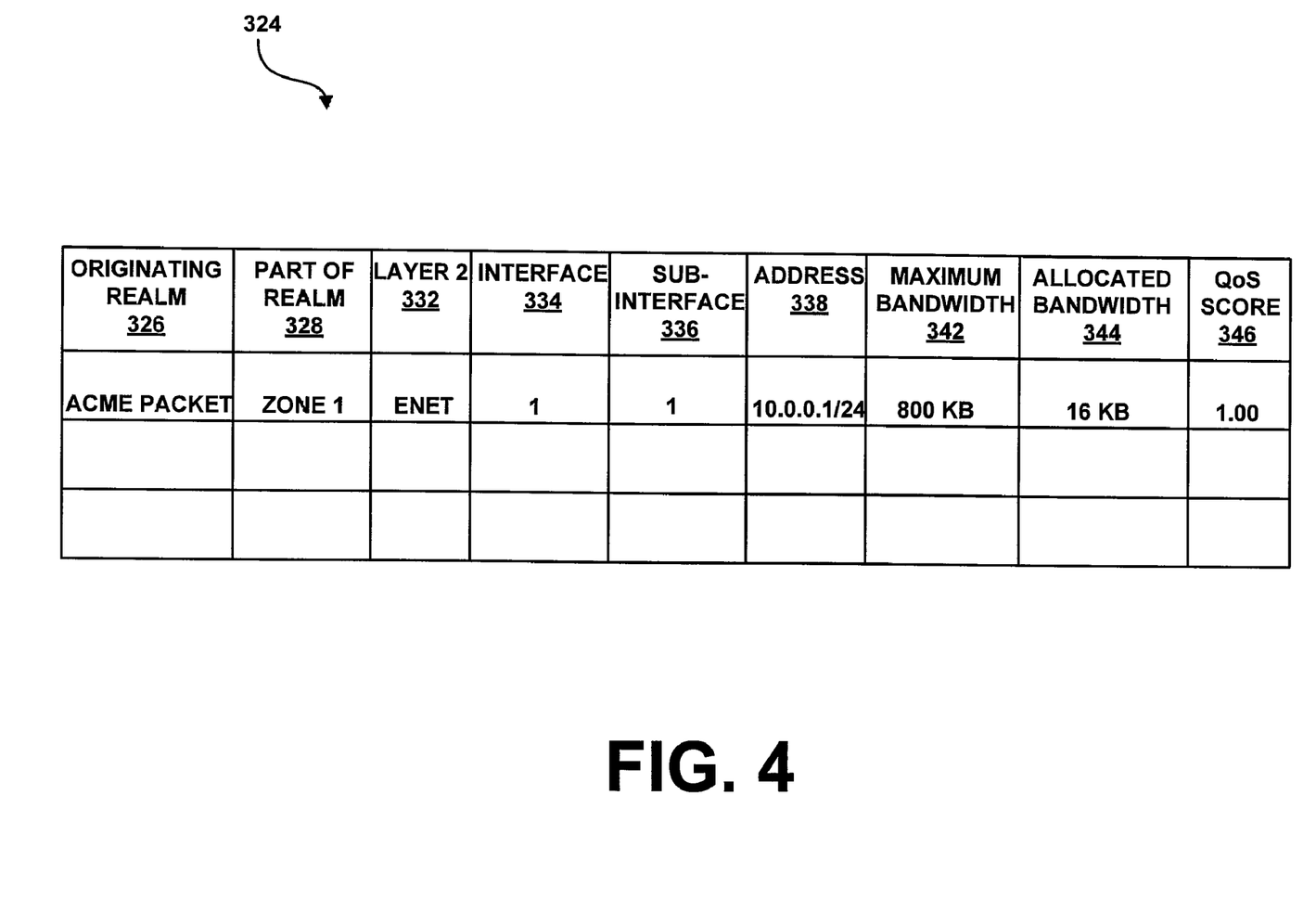
FIG. 4 is a schematic diagram of a realm database table located within the first session director of FIG. 3.

FIG. 4 is a schematic diagram of the realm database table 324 located within the realm database 322 (FIG. 3). As stated above, the realm database table 324 stores information required by the signaling proxy 314 (FIG. 3) to determine bandwidth availability, allocate bandwidth for transmission of multimedia packets, manage the allocated bandwidth and ensure that bandwidth quality and quantity is appropriate for transmission of multimedia packets. The realm database table 324 has an originating realm column 326, a part of realm column 328, a layer 2 column 332, an interface column 334, a sub-interface column 336, an address column 338, a maximum bandwidth column 342, an allocated bandwidth column 344 and a QoS score column 346. Within each column is a series of cells utilized to store information as described below.

Cells within the originating realm column 326 store text names of sources of signaling messages and multimedia packet flows. The text names serve as keys to the realm database table 324. The text names can contain different types of characters and are limited in number of characters by the amount of space allocated within the realm database 322 for the text names. Examples of originating realms may include, the first private network 224, the second private network 234 and the third private network 244 of FIG. 2.

Cells within the part of realm column 328 store text names that represent a location in which an originating realm is located. As an example, if an originating realm is a modem, the part of realm may be a local area network (LAN). As another example, if an originating realm is a LAN, the part of realm may be a public data network. Specific to FIG. 2, if the originating realm is the first private network 224, the part of realm may be the first aggregation realm 212.

Cells within the layer 2 column 332 store an identification of a type of layer 2 networking that is being used by the first session director 203. The identification of the type of layer 2 networking is used to further define information stored within the sub-interface column 336. The interface column 334 indicates on which interface 302, 304 (FIG. 3) the realm is located.

Cells within the sub-interface column 336 store numerical indicators that are used to provide layer 2 separation. Therefore, if more than one cell within the address column 338 has the same value stored therein, the sub-interface column 336 may be used to differentiate between the cells. For example, for Ethernet interfaces, the numerical indicator may represent an 802.1q VLAN tag. As another example, for ATM interfaces, the numerical indicator may represent a PVC number.

Cells within the address column 338 store addresses, such as IP addresses. In accordance with the first exemplary embodiment of the invention, each IP address is followed by a slash and a numerical representation of a maximum number of bits that may be used to identify an originating realm associated with the IP address. Therefore, when an IP address is provided by the signaling proxy 314 (FIG. 3), as is further explained below, for a source of a multimedia packet flow, the IP address is matched with entries stored within cells of the originating realm column 326, thereby determining a source of the multimedia packet flow. It should be noted that association between information stored within cells of the originating realm column 326, part of realm column 328, layer 2 column 332, interface column 334, sub-interface column 336, address column 338, maximum bandwidth column 342, allocated bandwidth column 344 and QoS score column 346 is indicated by the information being stored within cells located within the same row of the realm database table 324.

Cells within the maximum bandwidth column 342 store numerical representations of amounts of bandwidth that can be used for multimedia packet flows originating from the originating realms. Preferably, there is one numerical representation of an amount of bandwidth that can be used for multimedia packet flows originating from one originating realm. In accordance with the first exemplary embodiment of the invention, the amount of bandwidth indicated within cells of the maximum bandwidth column 342 is an advisory limit specified by an administrator of the first session director 203, and is less than a physical bandwidth made available by the originating realm. In accordance with an example illustrated by the realm database table 324 of FIG. 4, an Acme Packet originating realm is allowed a maximum of an 800 kilobyte (KB) bandwidth for multimedia packet transmission to or from the Acme Packet originating realm. As stated above, the actual physical bandwidth available for multimedia packet transmission may be much larger than the specified maximum bandwidth.

Values for cells within the allocated bandwidth column 344 and the QoS score column 346 are dynamically determined when the first session director 203 is being used, as explained below. Cells within the allocated bandwidth column 344 store a numerical representation of total bandwidth that has been allocated for multimedia packet flows by the first session director 203, wherein one numerical representation is stored for each originating realm. It should be noted that the numerical representation is maintained in real-time as new multimedia packet flows are provisioned for by the first session director 203 or as multimedia packet flows are terminated by the first session director 203.

Cells within the QoS score column 346 store a QoS score, as determined by the signaling proxy 314 (FIG. 3), which is a numerical representation of the bandwidth quality based on measured jitter, packet loss and latency of multimedia packet flows originating from the origination realm. Each of the above mentioned columns is described in more detail below.

Prior to use of the first session director 203 (FIG. 3), information, excluding the allocated bandwidth and QoS score, that is stored within the realm database table 324 is provided by the flow quality measurement engine 348 (FIG. 3) located within the first session director 203 (FIG. 3). Alternatively, the allocated bandwidth and QoS score are calculated by the signaling proxy 314 (FIG. 3) while the first session director 203 (FIG. 3) is in use. Further explanation of QoS score calculation is provided in detail below.

First Session Director Overview

Figure 5:
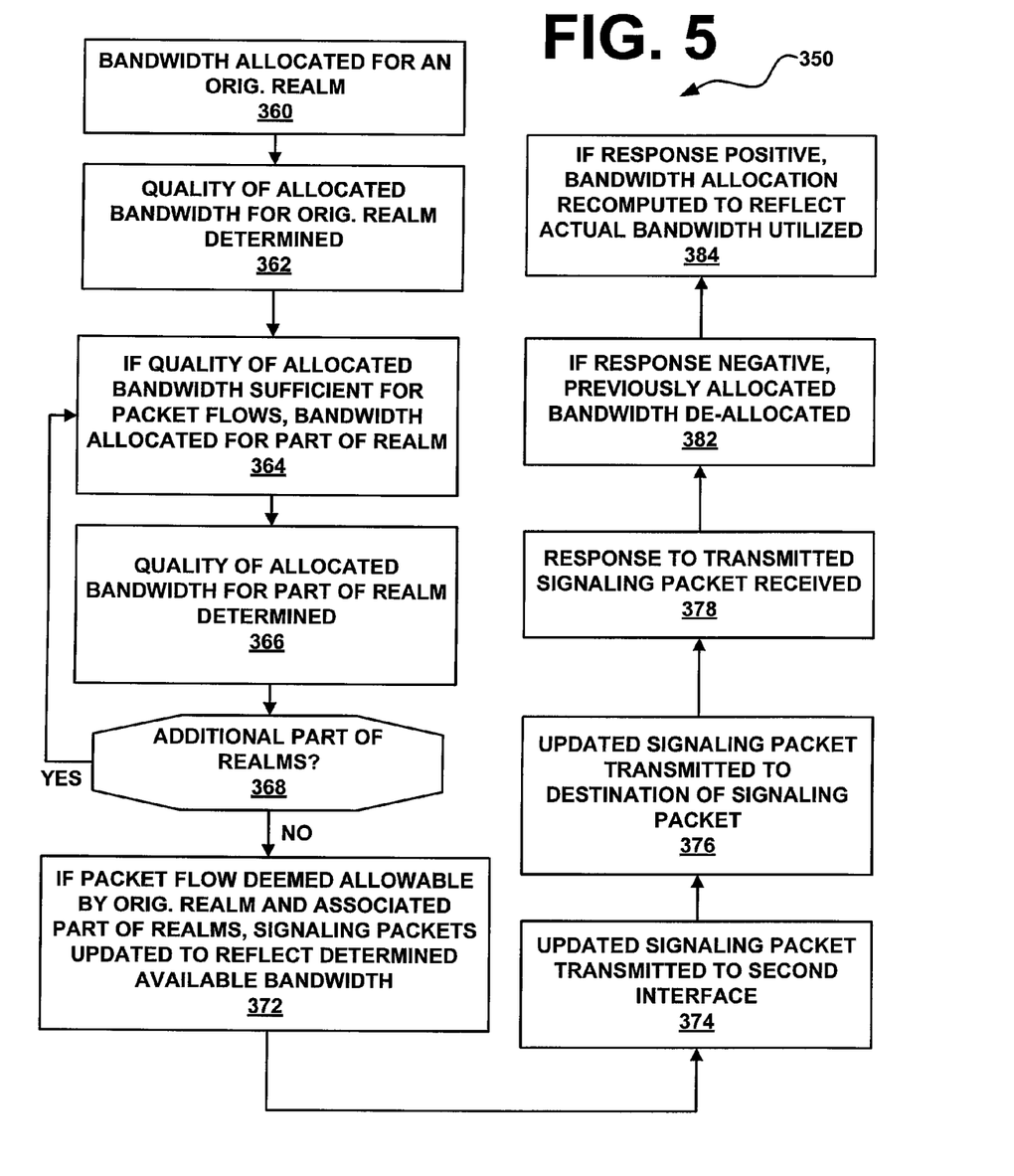
FIG. 5 is a flowchart providing an overview of functions performed via use of the first session director of FIG. 3.

FIG. 5 is a flowchart 350 providing an overview of functions performed via use of the first session director 203 of FIG. 3. Any process descriptions or blocks in flowcharts should be understood as representing modules, segments, or portions of code that include one or more executable instructions for implementing specific logical functions or steps in the process, and alternative implementations are included within the scope of the first exemplary embodiment of the invention in which functions may be executed out of order from that shown by figures or discussed herein, including substantially concurrently or in reverse order, depending on the functionality involved, as would be understood by those having ordinary skill in the art of the present invention.

Figure 6:
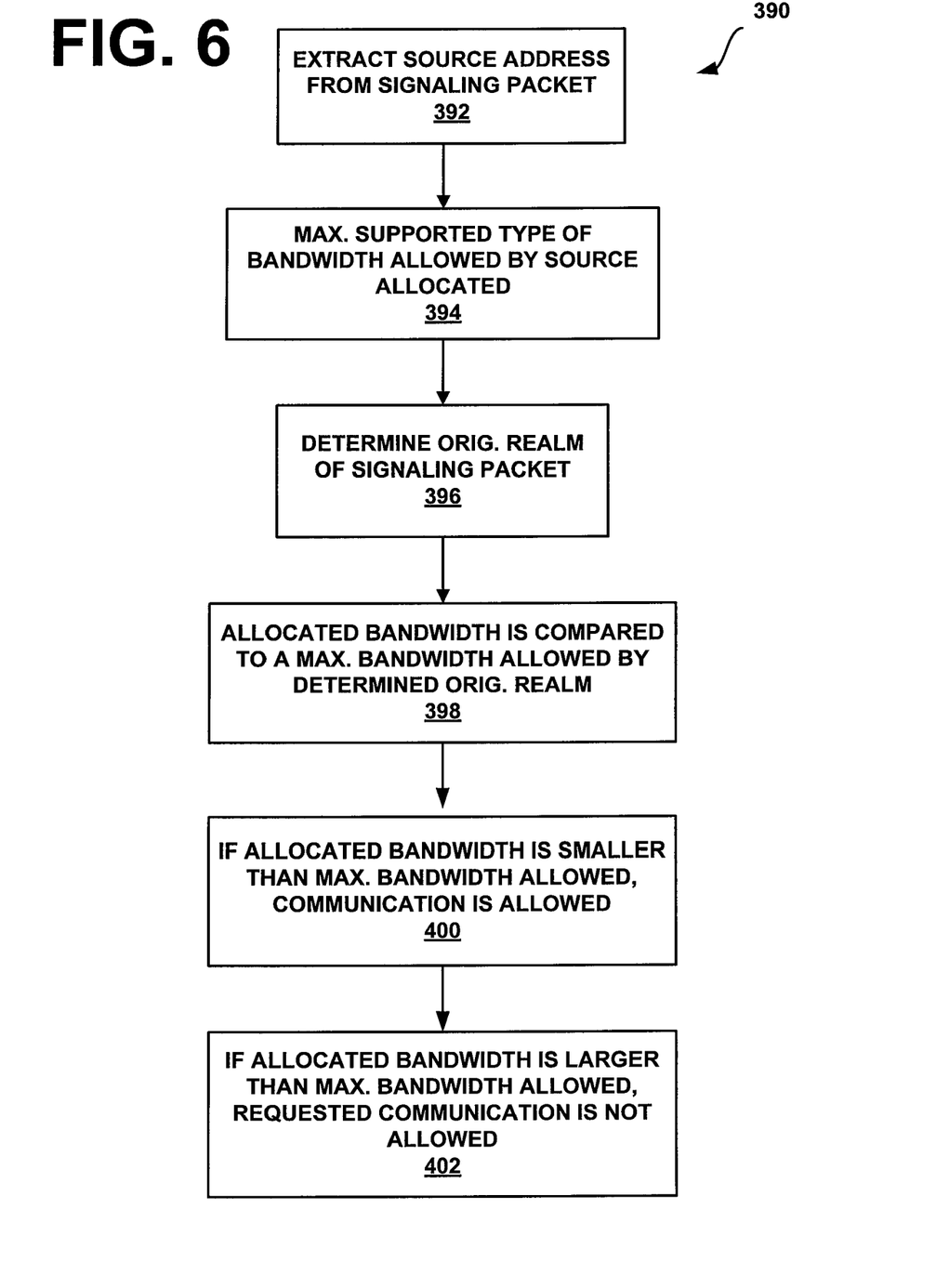
FIG. 6 is a flowchart further describing the step of allocating bandwidth for allowing multimedia packet flows via use of the first session director of FIG. 3.

As shown by block 360, bandwidth is allocated for an originating realm. Allocation of bandwidth for the originating realm allows traversal of multimedia packet flows from a source located within the originating realm to the first session director 203 (FIG. 3). Bandwidth allocation is further described by the description of FIG. 6 provided below.

Quality of the bandwidth allocated for the originating realm is determined to verify that current bandwidth quality is sufficient for the transmission of multimedia packets (block 362). If the bandwidth quality is sufficient for the transmission of multimedia packets, bandwidth is allocated for a part of realm (block 364). Quality of the bandwidth allocated for the part of realm is determined for transmission of multimedia packets (block 366). Functions described by block 364 and block 366 are repeated until there are no remaining part of realms associated with the originating realm (block 368).

As shown by block 372, if a multimedia packet flow is deemed allowable by the originating realm and the associated part of realms, signaling packets associated with the multimedia packet flows are updated if necessary to reflect determined available bandwidth. Addresses of multimedia descriptors, such as but not limited to, source addresses and destination addresses, located within signaling packets are updated so that multimedia packets and signaling packets being transmitted from originating realms or part of realms are transmitted to the first session director 203 (FIG. 2) prior to transmission to a destination address. In accordance with the first exemplary embodiment of the invention, the signaling proxy 314 (FIG. 3) performs the updating of the multimedia descriptors. An example of a method for updating multimedia descriptors is provided by the patent application entitled "System and Method for Assisting in Controlling Real-time Transport Protocol Flow Through Multiple Networks via Media Flow Routing," by MeLampy et al., having Ser. No. 09/844,204 and a filing date of Apr. 27, 2001, the disclosure of which is incorporated by reference in its entirety.

The updated signaling packet is transmitted from the signaling proxy 314 (FIG. 3) to the traffic manager 316 (FIG. 3). The traffic manager 316 (FIG. 3) then forwards the updated signaling packet to the second interface 304 (FIG. 3), (block 374), after which the updated signaling packet is transmitted to a destination of the updated signaling packet (block 376).

After a period of time, a response to the transmitted updated signaling packet is received by the first session director 203 (block 378). The response arrives at the first interface 302 (FIG. 3) and travels to the signaling proxy 314 (FIG. 3) for analysis. The response could be either a positive response indicating that a multimedia packet flow may begin (e.g., SIP OK, H.323 Connect, MGCP MODIFY CONNECTION), or a negative acknowledgement (e.g., SIP NACK, H.323 Release Complete). If the response received by the first session director is a negative acknowledgement, the previously allocated bandwidth is de-allocated (block 382) by adding the reserved bandwidth back within the realm database 324 (FIG. 4), thereby decreasing the value stored within cells of the allocated bandwidth column 344. It should be noted that a timeout period (e.g., MGCP Timeout) may also be considered a negative acknowledgement, wherein the signaling proxy 314 de-allocates previously allocated bandwidth if a response is not received by the first session director 203 after a predetermined period of time.

An example of bandwidth re-allocation is as follows. Assuming that a request for G.711 or G.729 is transmitted to a destination, an allocation of 80 KB is made, and a SIP NACK is returned by the destination to the first session director. The allocated 80 KB is then subtracted from the bandwidth value that was allocated for multimedia packet flows.

If, however, a positive indication is returned by the destination, bandwidth allocation is recomputed to reflect actual bandwidth to be utilized by multimedia packets, as described in the returned media descriptor (block 384). As an example, if the above-mentioned request for a G.711 or G.729 reserved 80 KB, and the final resultant media descriptor called for a G.729, then the allocated bandwidth stored within the allocated bandwidth column 344 is reduced to reflect the actual bandwidth flow.

Bandwidth Allocation

FIG. 6 is a flowchart 390 further illustrating the step of allocating bandwidth for transmission of multimedia packets from a source to the first session director 203 of FIG. 3 (block 360, FIG. 5). As shown by block 392, when a signaling packet is received from the source, a source address of the signaling message is extracted from the signaling packet. As an example, in the SIP and MGCP protocols, the source address may be found in a session description protocol (SDP) portion of INVITE and CREATE CONNECTION messages respectively.

A measure of bandwidth for multimedia packet transmission is allocated for the source, wherein the measure of bandwidth is equivalent to a maximum measure of bandwidth accommodated for by a maximum supported type of bandwidth allowed by the source (block 394). To elaborate, a source may support numerous types of bandwidth, wherein a maximum supported type of bandwidth would be the type requiring the largest allocation of bandwidth. As an example, if the source of the signaling message is requesting a G.729 voice communication or G.711 voice communication, an 80 KB bandwidth may be reserved for voice communication. The measure of bandwidth for multimedia packet transmission that is allocated for the source is stored in the allocated bandwidth 344 column (FIG. 4) of the realm database table 324 (FIG. 4). Specifically, in accordance with the first exemplary embodiment of the invention, the measure of bandwidth is stored within a cell of the allocated bandwidth 344 column (FIG. 4) that is within the same row as a cell, located within the address column 338 (FIG. 4), that has the address of the source stored therein.

An originating realm of the signaling packet is determined by searching for the source address within the address column 338 (FIG. 4) of the realm database table 324 (FIG. 4) and determining the originating realm associated with the source address (block 396). Specifically, in accordance with the first exemplary embodiment of the invention, the originating realm associated with the source address is stored within a cell of the originating realm column 326 (FIG. 4) that is within the same row of the realm database table (FIG. 4) as a cell within the address column 338 (FIG. 4) having the source address stored therein.

To ensure the bandwidth quantity is appropriate, the allocated bandwidth is compared to a maximum bandwidth allowed by the determined originating realm (block 398). The maximum bandwidth allowed by the determined originating realm is stored within a cell located within the maximum bandwidth column 342 (FIG. 4) of the realm database table 324 (FIG. 4) that is within the same row as the cell storing the determined originating realm. If the allocated bandwidth is smaller than the maximum bandwidth allowed, then bandwidth is available to allow a requested communication and the communication may be allowed (block 400). However, if the allocated bandwidth is larger than the maximum bandwidth allowed, bandwidth necessary for allowance of the requested communication is not available and the requested communication is not allowed (block 402).

In accordance with a second embodiment of the invention, if the allocated bandwidth is larger than the maximum bandwidth allowed, other types of communication may be requested by the source of the signaling message, thereby determining if a lower bandwidth type of communication is acceptable. Specifically, block 394 of FIG. 6 is replaced with allocating bandwidth for a lower supported category of bandwidth allowable by the source of the communication request. As an example, a G.711 call request may be downgraded to a G.729 call request. It should be noted that when a change is made for a lower supported category of bandwidth, media descriptors also require modification to eliminate higher bandwidth options from being selected by a party answering the communication request. As an example, media descriptors located within the SDP (for SIP and MGCP) and/or H.245 (for H.323) would need to be modified.

Determining Bandwidth Quality of Source

Having described how bandwidth allocation is performed via use of the first session director 203 (FIG. 3), reference is now made to determining quality of the allocated bandwidth and whether the bandwidth quality is sufficient for transmission of multimedia packets to the first session director 203 (FIG. 3) (block 362, FIG. 5). The bandwidth quality of the source may be determined by searching for a QoS score associated with the determined originating realm. Specifically, in accordance with the first exemplary embodiment of the invention, the QoS score column 346 (FIG. 4) of the realm database 322 (FIG. 4) is searched for a QoS score that is stored within a cell located within the same row as the cell within the originating realm column 326 (FIG. 4) having the originating realm stored therein.

As has been previously stated, a QoS score is a numerical representation of bandwidth quality based upon measured jitter, packet loss and latency of multimedia packet flows originating from an associated origination realm. QoS scores stored within the QoS score column 346 are periodically updated by the signaling proxy 314 (FIG. 3) after receipt of new values for jitter, packet loss and/or latency from the flow quality measurement engine 348 (FIG. 3). In fact, the flow quality measurement engine 348 (FIG. 3) may be programmed to perform periodic updates in accordance with an update schedule. After determining new jitter, packet loss and/or latency values, the flow quality measurement engine 348 (FIG. 3) transfers the value(s) to the signaling proxy 314 (FIG. 3), which may then update the QoS scores.

Measurement of jitter, packet loss and latency of multimedia packet flows is described in detail within the presently pending patent application entitled "System and Method for Determining Flow Quality Statistics for Real-time Transport Protocol Data Flows," by MeLampy et. al, filed on Jul. 23, 2001 and having Ser. No. 09/911,256, and patent application entitled "System and Method for Providing Statistics Gathering Within a Packet Network," by Khan et. al, filed on Jan. 29, 2002 and having Ser. No. 10/059,919, each of which are hereby incorporated by reference in their entirety.

As stated above, once the jitter, latency and packet loss are known for a multimedia packet flow, a QoS score is computed that summarizes the three statistics into a single value. There are numerous commercially available algorithms that are capable of being used to compute the QoS score. An example of a commercially available algorithm is VQmon® from Telchemy of Atlanta, Ga., USA. The algorithm provided by VQmon® allows the entry of jitter, latency and packet loss values, after which a single VQmon® score is computed that may be used as the QoS score.

In accordance with the first exemplary embodiment of the invention, the QoS score ranges from a value of zero (0), to a value of one (1). A QoS score of 1 represents that the current bandwidth quality associated with an originating realm is perfect, meaning that all bandwidth is available for transmission of multimedia packets and there is no measured jitter, latency or packet loss. An example of when a QoS score may be 1 is when there are no existing multimedia packet flows in an originating realm during an update period of the flow quality measurement engine 348 (FIG. 3).

To determine if quality of the allocated bandwidth is sufficient for transmission of the multimedia packet flow, the signaling proxy 314 (FIG. 3) compares the determined QoS score to a default quality level required for transmission of multimedia packets from the source. As an example, if the determined QoS score for a LAN is a value of 0.7, the determined QoS score of 0.7 is compared to a default quality level requirement, which for exemplary purposes, is assumed to be 0.8. Since the determined QoS is less than the default level requirement, the multimedia packet flow from the source may not be transmitted via the allocated bandwidth.

Alternatively, if the determined QoS score for a LAN is a value of 0.9, the determined QoS score of 0.9 is compared to a default quality level requirement, which for this example, is assumed to be 0.8. Since the determined QoS is more than the default level requirement, the multimedia packet flow from the source may be transmitted via the allocated bandwidth.

Allocating Bandwidth for Part of Realm

Figure 7:
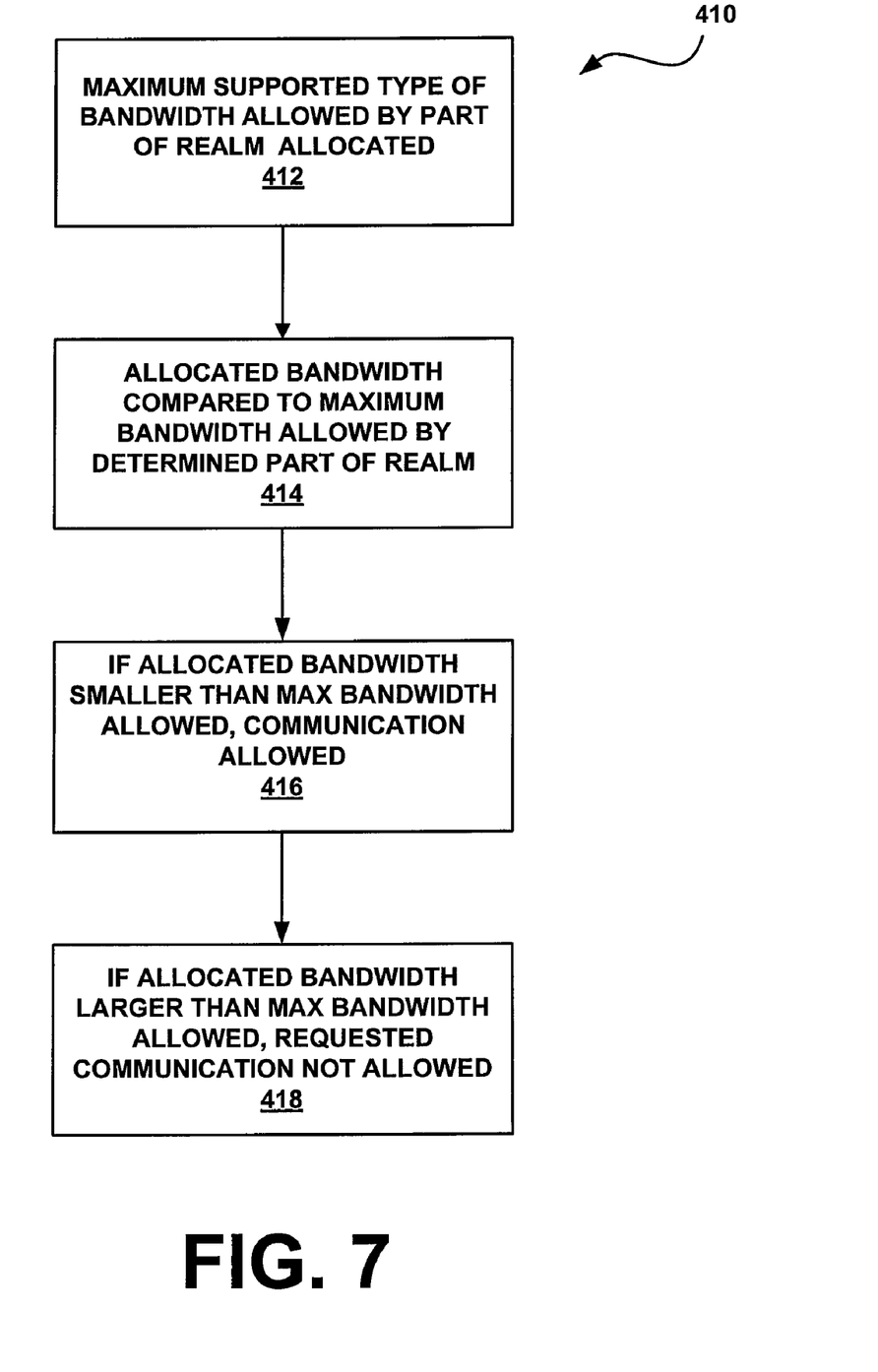
FIG. 7 is a flowchart further illustrating the step of allocating bandwidth for a part of realm via use of the first session director of FIG. 3.

Having described how to determine bandwidth quality associated with the source and how to determine whether bandwidth quality is sufficient for admission of a multimedia packet flow, reference is now made to the flowchart 410 of FIG. 7, which further illustrates the step of allocating bandwidth for a part of realm (block 364, FIG. 5).

As shown by block 412, a maximum supported type of bandwidth allowed by the part of realm is allocated. As an example, if the part of realm requests a G.729 voice communication or G.711 voice communication, an 80 KB bandwidth may be reserved for voice communication. In accordance with the first exemplary embodiment of the invention, a part of realm associated with a signaling packet may be determined by reading a cell within the part of realm column 328 (FIG. 4) of the realm database table 324 (FIG. 4) that is located within the same row as a cell storing the previously determined originating realm. It should be noted that, while not shown by FIG. 4, there may be a part of realm maximum bandwidth column and a part of realm allocated bandwidth column located within the realm database table 324 (FIG. 4) for storage and comparison of the maximum supported bandwidth and allocated bandwidth, respectively.

The bandwidth allocated for the part of realm is compared to a maximum bandwidth allowed by the determined part of realm (block 414). If the allocated bandwidth is smaller than the maximum bandwidth allowed, then bandwidth is available to allow the requested communication and the communication may be allowed (block 416). However, if the allocated bandwidth is larger than the maximum bandwidth allowed, bandwidth necessary for allowing the requested communication is not available and the requested communication is not allowed (block 418).

In accordance with a third embodiment of the invention, if the allocated bandwidth for the part of realm is larger than the maximum bandwidth allowed, other types of communication may be requested by the part of realm, thereby determining if a lower bandwidth type of communication is acceptable. Specifically, block 412 of FIG. 7 is replaced with allocating bandwidth for a lower supported category of bandwidth allowable by the part of realm. As an example, a G.711 call request may be downgraded to a G.729 call request. It should be noted that when a change is made for a lower supported category of bandwidth, media descriptors located within the SDP (for SIP and MGCP) and/or H.245 (for H.323) also require modification to eliminate higher bandwidth options from being selected by a party answering the communication request.

Determining Bandwidth Quality of Part of Realm

After bandwidth has been allocated for a part of realm (block 364, FIG. 5), quality of the bandwidth allocated for the part of realm is determined (block 366, FIG. 5). The bandwidth quality of the source may be determined by searching for the QoS score associated with the determined part of realm. Specifically, in accordance with the first exemplary embodiment of the invention, the QoS score column 346 (FIG. 4) of the realm database 322 (FIG. 4) is searched for a QoS score that is associated with the part of realm.

To determine if the bandwidth quality of the part of realm is sufficient for transmission of the multimedia packet flow, the signaling proxy 314 (FIG. 3) compares the determined QoS score to a default quality level required for transmission of multimedia packets from the part of realm. As stated above, allocation of bandwidth for the part of realm and determination of quality of the bandwidth allocated for the part of realm is then repeated until there are no remaining part of realms associated with the originating realm.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method of providing session admission control, comprising the steps of:
   allocating bandwidth to accommodate a bandwidth allocation request for an originating realm, the requested bandwidth for use in transmission of packets for a requested type of communication from a source located within the originating realm;
   determining if a quality of service associated with said allocated bandwidth is appropriate for transmission of the packets for the requested type of communication;
   determining if a quantity of said allocated bandwidth is appropriate for transmission of the packets for the requested type or communication; and
   de-allocating said allocated bandwidth if the quality of service or the quantity of said allocated bandwidth is determined not to be appropriate,
   wherein said step of determining if the quality of service associated with said allocated bandwidth is appropriate further comprises the steps of:
   determining a bandwidth quality of said allocated bandwidth by retrieving a quality of service score associated with an originating realm where a said source of said bandwidth allocation request is located; and determining that the quality of service associated with said allocated bandwidth is appropriate for transmission if said retrieved quality of service score is greater than or equal to a default bandwidth quality level required for transmission of the packets from said source for the requested type of communication.

2. The method of claim 1, wherein said step of allocating bandwidth further comprises the step of:

allocating a measure of bandwidth that is equivalent to a maximum supported type of bandwidth allowed for said source for said requested type of communication.

3. The method of claim 1, wherein said step of determining if the quantity of said allocated bandwidth is appropriate further comprises the step of:

determining that the quantity of said allocated bandwidth is appropriate if said allocated bandwidth is smaller than or equal to a maximum bandwidth allowed by an originating realm in which said source of said bandwidth allocation request is located.

4. The method of claim 1, wherein said step of determining if the quantity of said allocated bandwidth is appropriate further comprises the step of:

allocating bandwidth for a part of realm in which said originating realm is located, if the quality of service associated with said allocated bandwidth is appropriate to transmit the packets.

5. The method of claim 1, wherein said quality of service score is a numerical representation of bandwidth quality based upon measured jitter, packet loss and latency of packet flows originating from said originating realm.

6. The method of claim 1, wherein said step of determining that the quality of service associated with said allocated bandwidth is appropriate further comprises the step of:

determining a quality of service associated with bandwidth allocated for a part of realm in which said originating realm is located.

7. The method of claim 1, further comprising receiving a bandwidth allocation request from said source for a different type of communication that has lower quality of service or quantity requirements if the quality of service or the quantity of said allocated bandwidth are not determined to be appropriate for transmission of the packets.

8. The method of claim 1, wherein the requested type of communication is Voice over Internet Protocol (VoIP).

9. The method of claim 1, further comprising sending a signaling packet containing information about the allocated bandwidth, responsive to a determination that the allocated bandwidth is of appropriate quantity.

10. The method of claim 9, wherein the allocating bandwidth is performed by repeatedly allocating bandwidth for a part of the originating realm and checking if the quantity of allocated bandwidth for the part of the originating realm is sufficient, until no parts of the realm remain.

11. A method of providing system admission control, comprising:

allocating bandwidth equal to the maximum supported amount of bandwidth for a first packet flow representing a first requested type of communication;

determining if the quality of service associated with the allocated bandwidth is appropriate for transmission of the first packet flow;

sending a signaling packet containing bandwidth information associated with the first packet flow to a traffic manager if the allocated bandwidth is determined to be of appropriate quality;

recomputing the allocated bandwidth to reflect the actual bandwidth utilized by the first packet flow if a positive response is received from the traffic manager, the positive response indicating that transmission of the first packet flow is allowed; and transmitting the first packet flow using the recomputed bandwidth.

12. The method of claim 11, further comprising de-allocating the allocated bandwidth if a negative response is received from the traffic manager or a response is not returned from the traffic manager within a predetermined period of time, the negative response indicating that transmission of the first packet flow is not allowed.

13. The method of claim 12, further comprising allocating bandwidth for a second packet flow, representing a second type of communication that has lower bandwidth or quality of service requirements than the first requested type of communication, if the first packet flow is not transmitted.

14. The method of claim 11, wherein the step of determining if the quality of service associated with the allocated bandwidth is appropriate for transmission of the first packet flow comprises:

determining the quality of service associated with said allocated bandwidth by retrieving a quality of service score associated with an originating realm in which a source of the first flow of packets is located; and determining that the quality of service associated with said allocated bandwidth is appropriate if said retrieved quality of service score is greater than or equal to a default bandwidth quality level required for transmission of packets from said source for the first requested type of communication.

15. The method of claim 14, wherein said quality of service score is a numerical representation of bandwidth quality based upon measured jitter, packet loss and latency of packet flows originating from said originating realm.

16. The method of claim 11, wherein the requested type of communication is Voice over Internet Protocol (VoIP).

17. A network device comprising:

memory; and a processor configured by instructions retrieved from the memory to:

allocate bandwidth to accommodate a bandwidth allocation request for an originating realm, the requested bandwidth for use in transmission of packets for a requested type of communication from a source located within the originating realm;

determine if a quality of service associated with said allocated bandwidth is appropriate for transmission of the packets for the requested type of communication, by determining a bandwidth quality of said allocated bandwidth by retrieving a quality of service score associated with an originating realm where a said source of said bandwidth allocation request is located, and by determining that the quality of service associated with said allocated bandwidth is appropriate for transmission if said retrieved quality of service score is greater than or equal to a default bandwidth quality level required for transmission of the packets from said source for the requested type of communication;

determine if a quantity of said allocated bandwidth is appropriate for transmission of the packets for the requested type or communication; and de-allocate said allocated bandwidth if the quality of service or the quantity of said allocated bandwidth is determined not to be appropriate.

18. The network device of claim 17, wherein the processor Is further configured by the instructions retrieved from the memory to:

determine that the quantity of said allocated bandwidth is appropriate if said allocated bandwidth is smaller than or equal to a maximum bandwidth allowed by an originating realm in which said source of said bandwidth allocation request is located.

19. The network device of claim 17, wherein the processor Is further configured by the instructions retrieved from the memory to:

allocate bandwidth for a part of realm in which said originating realm is located, if the quality of service associated with said allocated bandwidth is appropriate to transmit the packets.

20. The network device of claim 17, wherein the processor Is further configured by the instructions retrieved from the memory to:

determining a quality of service associated with bandwidth allocated for a part of realm in which said originating realm is located.

* * * * *